US011551145B2

(12) United States Patent
Gupta et al.

(10) Patent No.: US 11,551,145 B2
(45) Date of Patent: Jan. 10, 2023

(54) PERFORMANCE BASED SWITCHING OF A MODEL TRAINING PROCESS

(71) Applicant: International Business Machines Corporation, Armonk, NY (US)

(72) Inventors: Sidharth Gupta, Champaign, IL (US); Parijat Dube, Yorktown Heights, NY (US); Ashish Verma, Nanuet, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 401 days.

(21) Appl. No.: 16/782,713

(22) Filed: Feb. 5, 2020

(65) Prior Publication Data
US 2021/0241169 A1 Aug. 5, 2021

(51) Int. Cl.
*G06N 20/00* (2019.01)
*G06F 17/18* (2006.01)
*G06F 11/34* (2006.01)

(52) U.S. Cl.
CPC ........ *G06N 20/00* (2019.01); *G06F 11/3466* (2013.01); *G06F 17/18* (2013.01)

(58) Field of Classification Search
CPC .. G06F 11/3466; G06F 11/3688; G06F 17/18; G06N 3/08; G06N 20/00; G06N 3/0454
USPC .......................................................... 706/12
See application file for complete search history.

(56) References Cited

U.S. PATENT DOCUMENTS 9,601,109 B2    3/2017  Horesh et al.
2019/0385060 A1*  12/2019  Carmeli ............... G06N 3/0472
2020/0090810 A1*  3/2020  Sakaguchi ............ G16H 50/20

FOREIGN PATENT DOCUMENTS

EP         3543917          9/2019

OTHER PUBLICATIONS

Wang et al., "On the Convergence and Robustness of Adversarial Training," Proceedings of the 36th International Conference on Machine Learning, May 2019, pp. 6586-6595, 10 pages.
Wen et al., "Adversarial Training: embedding adversarial perturbions into the parameter space of a neural network to build a robust system," arXiv:1910.04279v1 [cs.LG], Oct. 9, 2019, 10 pages.

(Continued)

*Primary Examiner* — John H Le
(74) *Attorney, Agent, or Firm* — Amin, Turocy & Watson, LLP

(57) ABSTRACT

Systems, computer-implemented methods, and computer program products that can facilitate switching a model training process from a ground truth training phase to an adversarial training phase based on performance of a model trained in the ground truth training phase are provided. According to an embodiment, a system can comprise a memory that stores computer executable components and a processor that executes the computer executable components stored in the memory. The computer executable components can comprise an analysis component that identifies a performance condition of a model trained in a model training process. The computer executable components can further comprise a trainer component that switches the model training process from a ground truth training process to an adversarial training process based on the identified performance condition.

17 Claims, 10 Drawing Sheets

(56) References Cited

OTHER PUBLICATIONS

Chang et al., "Efficient Two-Step Adversarial Defense for Deep Neural Networks," arXiv:1810.03739v1 [cs.LG], Oct. 8, 2018, 16 pages.
Sahay et al., "A Computationally Efficient Method for Defending Adversarial Deep Learning Attacks," arXiv:1906.05599v1 [cs.LG], Jun. 13, 2019, 6 pages.
Bhat et al., "Towards Efficient Methods for Training Robust Deep Neural Networks," Feb. 13, 2019, 18 pages.
Zhang et al., "You Only Propagate Once: Accelerating Adversarial Training via Maximal Principle," arXiv:1905.00877v6 [stat.ML], Nov. 1, 2019, 16 pages.
Mell et al., "The NIST Definition of Cloud Computing," Recommendations of the National Institute of Standards and Technology, NIST Special Publication 800-145, Sep. 2011, 7 pages.

\* cited by examiner

| Network architecture | Adversarial training (2xV100) | Proposed (2xV100) |
|---|---|---|
| ResNet 50 | 6.8 hours | 3.7 hours |
| WideResNet 28x10 | 14.7 hours | 7.8 hours |

| Attack strength | ResNet 50 Adversarial training | ResNet 50 Proposed | WideResNet 28x10 Adversarial training | WideResNet 28x10 Proposed |
|---|---|---|---|---|
| -2 | 57.13% | 59.03% | 69.01% | 71.25% |
| -1 | 40.25% | 42.95% | 50.12% | 52.55% |
| 0 | 38.39% | 41.13% | 48.09% | 49.92% |
| 1 | 37.14% | 39.92% | 46.66% | 48.40% |
| 2 | 25.93% | 27.77% | 34.90% | 35.63% |
| 3 | 20.58% | 21.38% | 29.10% | 29.04% |
| 4 | 17.59% | 18.07% | 25.96% | 25.26% |

FIG. 7

PERFORMANCE BASED SWITCHING OF A MODEL TRAINING PROCESS

BACKGROUND

The subject disclosure relates to a model training process, and more specifically, to switching a model training process from a ground truth training phase to an adversarial training phase based on performance of a model trained in the ground truth training phase.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that can facilitate switching a model training process from a ground truth training phase to an adversarial training phase based on performance of a model trained in the ground truth training phase are described.

According to an embodiment, a system can comprise a memory that stores computer executable components and a processor that executes the computer executable components stored in the memory. The computer executable components can comprise an analysis component that identifies a performance condition of a model trained in a model training process. The computer executable components can further comprise a trainer component that switches the model training process from a ground truth training process to an adversarial training process based on the identified performance condition.

According to another embodiment, a computer-implemented method can comprise identifying, by a system operatively coupled to a processor, a performance condition of a model trained in a model training process. The computer-implemented method can further comprise switching, by the system, the model training process from a ground truth training process to an adversarial training process based on the identified performance condition.

According to another embodiment, a computer program product facilitating a process to switch a model training process from a ground truth training phase to an adversarial training phase based on performance of a model trained in the ground truth training phase is provided. The computer program product comprising a computer readable storage medium having program instructions embodied therewith, the program instructions executable by a processor to cause the processor to identify, by the processor, a performance condition of a model trained in a model training process. The program instructions are further executable by the processor to cause the processor to switch, by the processor, the model training process from a ground truth training process to an adversarial training process based on the identified performance condition.

DESCRIPTION OF THE DRAWINGS

FIG. 7 illustrates example, non-limiting tables that demonstrate example accuracy and reduction in training time in accordance with one or more embodiments described herein.

DETAILED DESCRIPTION

Figure 1:
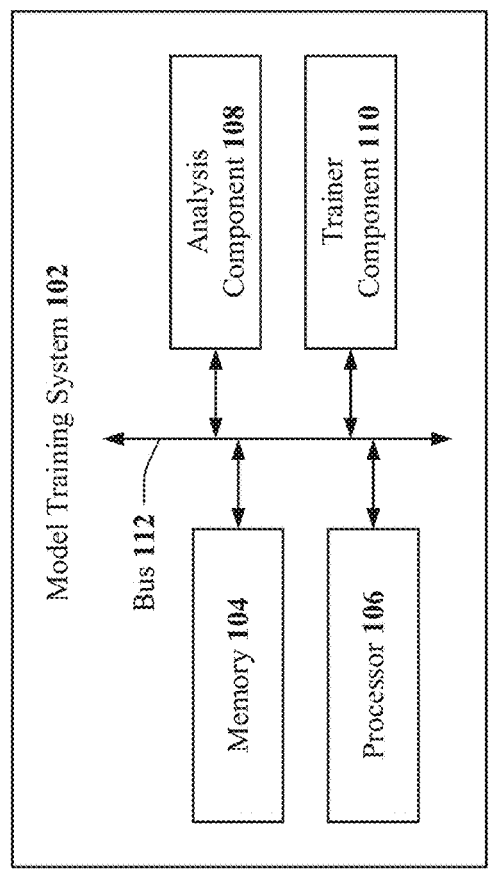
FIG. 1 illustrates a block diagram of an example, non-limiting system that can facilitate switching a model training process from a ground truth training phase to an adversarial training phase based on performance of a model trained in the ground truth training phase in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Machine learning models such as deep neural networks have shown outstanding results in artificial intelligence (AI) tasks such as image classification. Such models are increasingly being deployed in environments where security and robustness needs to be guaranteed. However, it has been shown that if an adversary modifies images by an imperceptible amount, a trained neural network image classifier that normally classifies correctly with 96% accuracy can classify images with almost 0% accuracy.

Typical training trajectory of such a machine learning model described above is as follows. The model is initialized with random weights, and in the initial training phase, the model parameters fluctuate wildly as the model is evolving. Towards the final stage it stabilizes and then a few learning rate drops are invoked to achieve convergence.

Some existing approaches that attempt to improve robustness of such a machine learning model described above function as follows. Adversarial samples are generated at each training iteration by modifying the clean samples (also referred to herein as ground truth samples) for that iteration with a small targeted perturbation. Rather than using the clean images as the training data, the adversarial samples are used. The network in this process learns how to classify these modified, adversarial samples. A problem with such existing approaches is that the procedure to generate adversarial samples is time consuming. For instance, it can take up to 10 times longer compared to training on clean samples which makes it prohibitive on large datasets. Another problem with such existing approaches is that while they improve the accuracy of the neural network to adversarial samples, the accuracy of the model tested using clean images suffers.

Other existing approaches attempt to improve robustness of a machine learning model by using adversarial training samples at the beginning of a training process to train the model. A problem with such approaches is that using adversarial training from the beginning is not productive because in the initial training iterations, the parameters are fluctuating wildly and so do the adversaries. Adversaries generated during initial iterations are hardly relevant for the final model and hence training on these adversaries is not required.

Other existing approaches attempt to improve robustness of a machine learning model by using adversarial training samples at the end of a training process to train the model. Such approaches implement adversarial training after the model has fully converged. A problem with these approaches is that implementing adversarial training at the end of the training process after the model has fully converged is sub-optimal.

Given the problems described above with current model training processes, the present disclosure can be implemented to produce a solution to such problems in the form of systems, computer-implemented methods, and/or computer program products that can identify a performance condition of a model trained in a model training process and/or switch the model training process from a ground truth training process to an adversarial training process based on the identified performance condition. By identifying the performance condition and/or switching the model training process from a ground truth training process to an adversarial training process, the present disclosure can thereby facilitate at least one of: reduced overall robustness training time; reduced adversarial sample generation time; reduced computational costs of a processor used to generate the adversarial samples and/or to train the model; and/or improved accuracy of the model trained using ground truth training data and adversarial training data.

FIG. 1 illustrates a block diagram of an example, non-limiting system 100 that can facilitate switching a model training process from a ground truth training phase to an adversarial training phase based on performance of a model trained in the ground truth training phase in accordance with one or more embodiments described herein. In some embodiments, system 100 can comprise a model training system 102, which can be associated with a cloud computing environment. For example, model training system 102 can be associated with cloud computing environment 950 described below with reference to FIG. 9 and/or one or more functional abstraction layers described below with reference to FIG. 10 (e.g., hardware and software layer 1060, virtualization layer 1070, management layer 1080, and/or workloads layer 1090).

In some embodiments, model training system 102 and/or components thereof (e.g., analysis component 108, trainer component 110, sample generator component 202, etc.) can employ one or more computing resources of cloud computing environment 950 described below with reference to FIG. 9 and/or one or more functional abstraction layers described below with reference to FIG. 10 to execute one or more operations in accordance with one or more embodiments of the subject disclosure described herein. For example, cloud computing environment 950 and/or such one or more functional abstraction layers can comprise one or more classical computing devices (e.g., classical computer, classical processor, virtual machine, server, etc.) and/or one or more quantum computing devices (e.g., quantum computer, quantum processor, quantum circuit simulation software, superconducting circuit, etc.) that can be employed by model training system 102 and/or components thereof to execute one or more operations in accordance with one or more embodiments of the subject disclosure described herein. For instance, model training system 102 and/or components thereof can employ such one or more classical and/or quantum computing devices to execute one or more mathematical functions and/or equations, one or more computing and/or processing scripts, one or more models (e.g., artificial intelligence (AI) models, machine learning (ML) models, etc.), one or more classical and/or quantum algorithms, and/or another operation in accordance with one or more embodiments of the subject disclosure described herein. In another example, model training system 102 and/or components thereof can employ such one or more classical and/or quantum computing devices to train one or more models (e.g., artificial intelligence (AI) models, machine learning (ML) models, etc.).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Continuing now with FIG. 1. According to several embodiments, model training system 102 can comprise a memory 104, a processor 106, an analysis component 108, a trainer component 110, and/or a bus 112.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100 and/or model training system 102 can further comprise various computer and/or computing-based elements described herein with reference to operating environment 800 and FIG. 8. In several embodiments, such computer and/or computing-based elements can be used in connection with implementing one or more of the systems, devices, components, and/or computer-implemented operations shown and described in connection with FIG. 1 or other figures disclosed herein.

Memory 104 can store one or more computer and/or machine readable, writable, and/or executable components and/or instructions that, when executed by processor 106 (e.g., a classical processor, a quantum processor, etc.), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to model training system 102, analysis component 108, trainer component 110, and/or another component associated with model training system 102 (e.g., sample generator component 202, etc.), as described herein with or without reference to the various figures of the subject disclosure.

Memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 816 and FIG. 8. Such examples of memory 104 can be employed to implement any embodiments of the subject disclosure.

Processor 106 can comprise one or more types of processors and/or electronic circuitry (e.g., a classical processor, a quantum processor, etc.) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor. Further examples of processor 106 are described below with reference to processing unit 814 and FIG. 8. Such examples of processor 106 can be employed to implement any embodiments of the subject disclosure.

Model training system 102, memory 104, processor 106, analysis component 108, trainer component 110, and/or another component of model training system 102 as described herein can be communicatively, electrically, operatively, and/or optically coupled to one another via a bus 112 to perform functions of system 100, model training system 102, and/or any components coupled therewith. In several embodiments, bus 112 can comprise one or more memory bus, memory controller, peripheral bus, external bus, local bus, a quantum bus, and/or another type of bus that can employ various bus architectures. Further examples of bus 112 are described below with reference to system bus 818 and FIG. 8. Such examples of bus 112 can be employed to implement any embodiments of the subject disclosure.

Model training system 102 can comprise any type of component, machine, device, facility, apparatus, and/or instrument that comprises a processor and/or can be capable of effective and/or operative communication with a wired and/or wireless network. All such embodiments are envisioned. For example, model training system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Model training system 102 can be coupled (e.g., communicatively, electrically, operatively, optically, etc.) to one or more external systems, sources, and/or devices (e.g., classical and/or quantum computing devices, communication devices, etc.) via a data cable (e.g., High-Definition Multimedia Interface (HDMI), recommended standard (RS) 232, Ethernet cable, etc.). In some embodiments, model training system 102 can be coupled (e.g., communicatively, electrically, operatively, optically, etc.) to one or more external systems, sources, and/or devices (e.g., classical and/or quantum computing devices, communication devices, etc.) via a network.

In some embodiments, such a network can comprise wired and wireless networks, including, but not limited to, a cellular network, a wide area network (WAN) (e.g., the Internet) or a local area network (LAN). For example, model training system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, model training system 102 can thus include hardware (e.g., a central processing unit (CPU), a transceiver, a decoder, a quantum processor, etc.), software (e.g., a set of threads, a set of processes, software in execution, quantum pulse schedule, quantum circuit, etc.) or a combination of hardware and software that facilitates communicating information between model training system 102 and external systems, sources, and/or devices (e.g., computing devices, communication devices, etc.).

Model training system 102 can comprise one or more computer and/or machine readable, writable, and/or executable components and/or instructions that, when executed by processor 106 (e.g., a classical processor, a quantum processor, etc.), can facilitate performance of operations defined by such component(s) and/or instruction(s). Further, in numerous embodiments, any component associated with model training system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, analysis component 108, trainer component 110, and/or any other components associated with model training system 102 as disclosed herein (e.g., communicatively, electronically, operatively, and/or optically coupled with and/or employed by model training system 102), can comprise such computer and/or machine readable, writable, and/or executable component(s) and/or instruction(s). Consequently, according to numerous embodiments, model training system 102 and/or any components associated therewith as disclosed herein, can employ processor 106 to execute such computer and/or machine readable, writable, and/or executable component(s) and/or instruction(s) to facilitate performance of one or more operations described herein with reference to model training system 102 and/or any such components associated therewith.

Model training system 102 can facilitate performance of operations executed by and/or associated with analysis component 108, trainer component 110, and/or another component associated with model training system 102 as disclosed herein (e.g., sample generator component 202, etc.). For example, as described in detail below, model training system 102 can facilitate via processor 106 (e.g., a classical processor, a quantum processor, etc.): identifying a performance condition of a model trained in a model training process; and/or switching the model training process from a ground truth training process to an adversarial training process based on the identified performance condition.

In another example, model training system 102 can further facilitate via processor 106 (e.g., a classical processor, a quantum processor, etc.): training the model using ground truth training data until test accuracy values of the model over a defined number of training epochs are within a defined range of values (e.g., until the model is no longer evolving); training the model using ground truth training data until a learning rate reduction of the model is within a defined number of training epochs from a current training epoch; training the model, based on identification of the performance condition, using adversarial training data until convergence of test accuracy values of the model; generating adversarial training data (e.g., adversarial samples) to train the model using the adversarial training process based on identification of the performance condition; determining a test accuracy value of the model at a current training epoch; computing a running average of test accuracy values of the model over a defined number of training epochs to identify the performance condition; and/or switching the model training process from the ground truth training process to the adversarial training process based on the performance condition to facilitate at least one of reduced overall robustness training time, reduced adversarial sample generation time, reduced computational costs of a processor used to generate the adversarial samples and/or to train the model, or improved accuracy of the model trained using ground truth training data and adversarial training data.

As referenced herein, a ground truth training process can describe a model training process where the model is trained using ground truth training data comprising clean training data, for example, training data that has not been compromised (e.g., altered, modified, tainted, etc.). Additionally, or alternatively, as referenced herein, an adversarial training process can describe a model training process where the model is trained using adversarial training data comprising a compromised version of the ground truth training data (e.g., training data that has been altered, modified, tainted, etc.).

Analysis component 108 can identify a performance condition of a model trained in a model training process. For example, analysis component 108 can identify a performance condition such as, for instance, test accuracy and/or a scheduled learning rate reduction of a model trained (e.g., via trainer component 110 as described below) using ground truth training data (also referred to herein as clean training data). In this example, such a model can comprise a machine learning (ML) model such as, for instance, a neural network (e.g., a residual neural network (ResNet) 50, a wide residual neural network (WideResNet) 28×10, etc.).

To facilitate such identification of the performance condition, analysis component 108 can: a) determine a test accuracy value of a model at a current training epoch (e.g., by testing the model in a ground truth training phase using ground truth samples (clean samples)); b) compute a running average of test accuracy values of the model over a defined number of training epochs; c) determine whether test accuracy values of the model over a defined number of training epochs are within a defined range of values (e.g., within a range of +/−5% of the running average); and/or d) determine that a learning rate reduction of the model (e.g., a scheduled learning rate reduction of the model) is within a defined number of training epochs from the current training epoch.

Trainer component 110 can switch a model training process from a ground truth training process to an adversarial training process based on identification (e.g., via analysis component 108) of the performance condition defined above. For example, trainer component 110 can train the model using ground truth training data until analysis component 108 determines that test accuracy values of the model over a defined number of training epochs are within a defined range of values and/or until analysis component 108 determines that a learning rate reduction of the model (e.g., a scheduled learning rate reduction of the model) is within a defined number of training epochs from a current training epoch.

Based on identification of the performance condition by analysis component 108 as described above, trainer component 110 can train the model using adversarial training data until convergence of test accuracy values of the model. For example, based on identification of the performance condition by analysis component 108 as described above, trainer component 110 can thereafter train the model using only adversarial training data (e.g., adversarial samples) until convergence of test accuracy values of the model, where such adversarial training data can be generated by sample generator component 202 as described below with reference to FIG. 2.

It should be appreciated that trainer component 110 can switch the model training process to the adversarial training process based on identification of the performance condition by analysis component 108 and/or can further train the model thereafter using only adversarial training data until convergence of test accuracy values of the model to facilitate at least one of: reduced overall robustness training time; reduced adversarial sample generation time; reduced computational costs of a processor used to generate the adversarial samples and/or to train the model; or improved accuracy of the model trained using ground truth training data and adversarial training data.

Trainer component 110 can train a model using a ground truth training phase and an adversarial training phase as described above by implementing supervised learning (e.g., reinforcement learning). Trainer component 110 can train a model using a ground truth training phase and an adversarial training phase as described above based on classifications, correlations, inferences and/or expressions associated with principles of artificial intelligence. For instance, trainer component 110 can train a model using a ground truth training phase and an adversarial training phase as described above by employing a probabilistic and/or statistical-based analysis (e.g., factoring into the analysis utilities and costs).

Trainer component 110 can employ any suitable machine learning based techniques, statistical-based techniques, and/or probabilistic-based techniques to train a model using a ground truth training phase and an adversarial training phase as described above. For example, trainer component 110 can employ an expert system, fuzzy logic, support vector machine (SVM), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or another model. In some embodiments, trainer component 110 can perform a set of machine learning computations associated with training a model using a ground truth training phase and an adversarial training phase as described above. For example, trainer component 110 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to train a model using a ground truth training phase and an adversarial training phase as described above.

Figure 2:
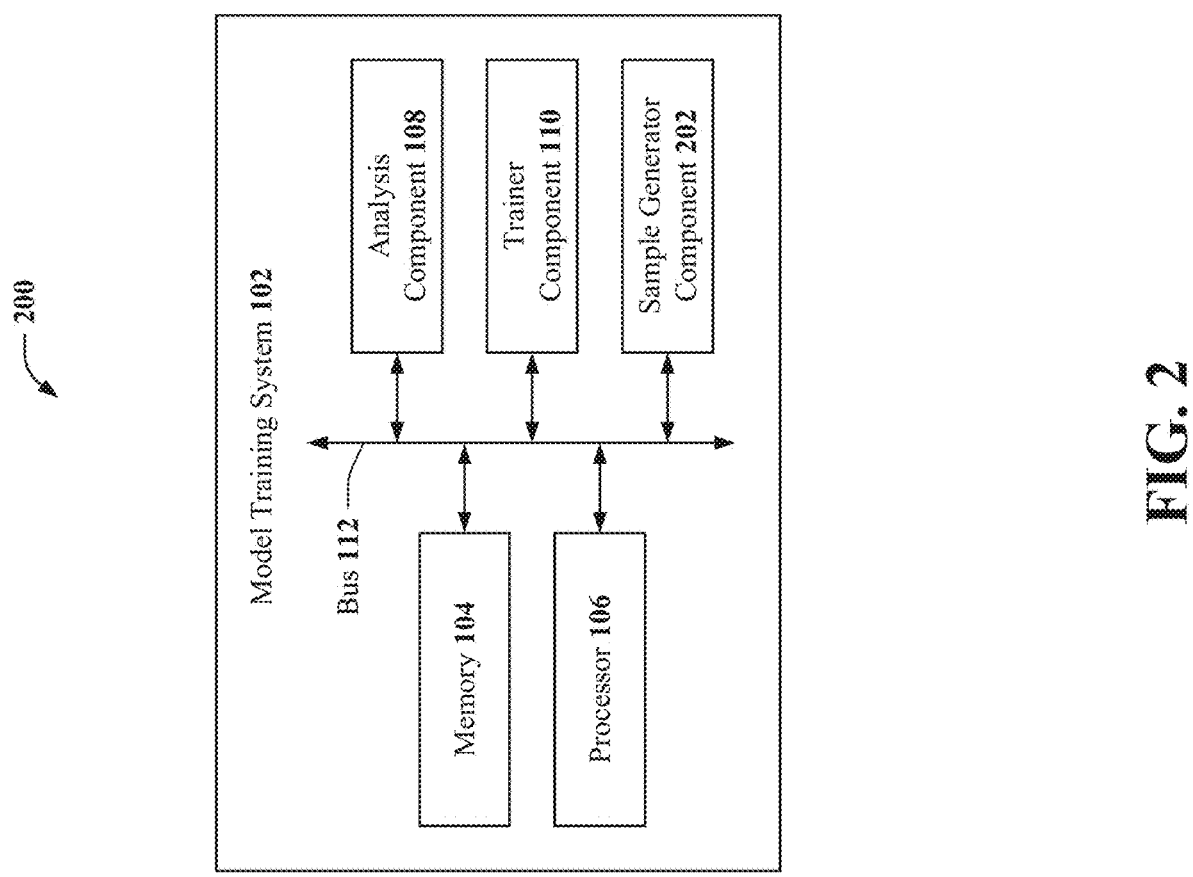
FIG. 2 illustrates a block diagram of an example, non-limiting system that can facilitate switching a model training process from a ground truth training phase to an adversarial training phase based on performance of a model trained in the ground truth training phase in accordance with one or more embodiments described herein.

FIG. 2 illustrates a block diagram of an example, non-limiting system 200 that can facilitate switching a model training process from a ground truth training phase to an adversarial training phase based on performance of a model trained in the ground truth training phase in accordance with one or more embodiments described herein. System 200 can comprise model training system 102. In some embodiments, model training system 102 can comprise a sample generator component 202. Repetitive description of like elements and/or processes employed in respective embodiments is omitted for sake of brevity.

Sample generator component 202 can generate adversarial training data to train a model using an adversarial training process based on identification of a performance condition of the model. For example, based on identification of the performance condition by analysis component 108 as described above, sample generator component 202 can use projected gradient descent (PGD) to generate an adversarial counterpart for each ground truth sample in a batch of ground truth training data. In this example, such adversarial training data and/or adversarial counterparts can comprise adversarial samples, which can comprise modified versions of ground truth samples having one or more targeted perturbations that can be used by trainer component 110 to train the model until convergence of test accuracy values of the model.

Figure 3:
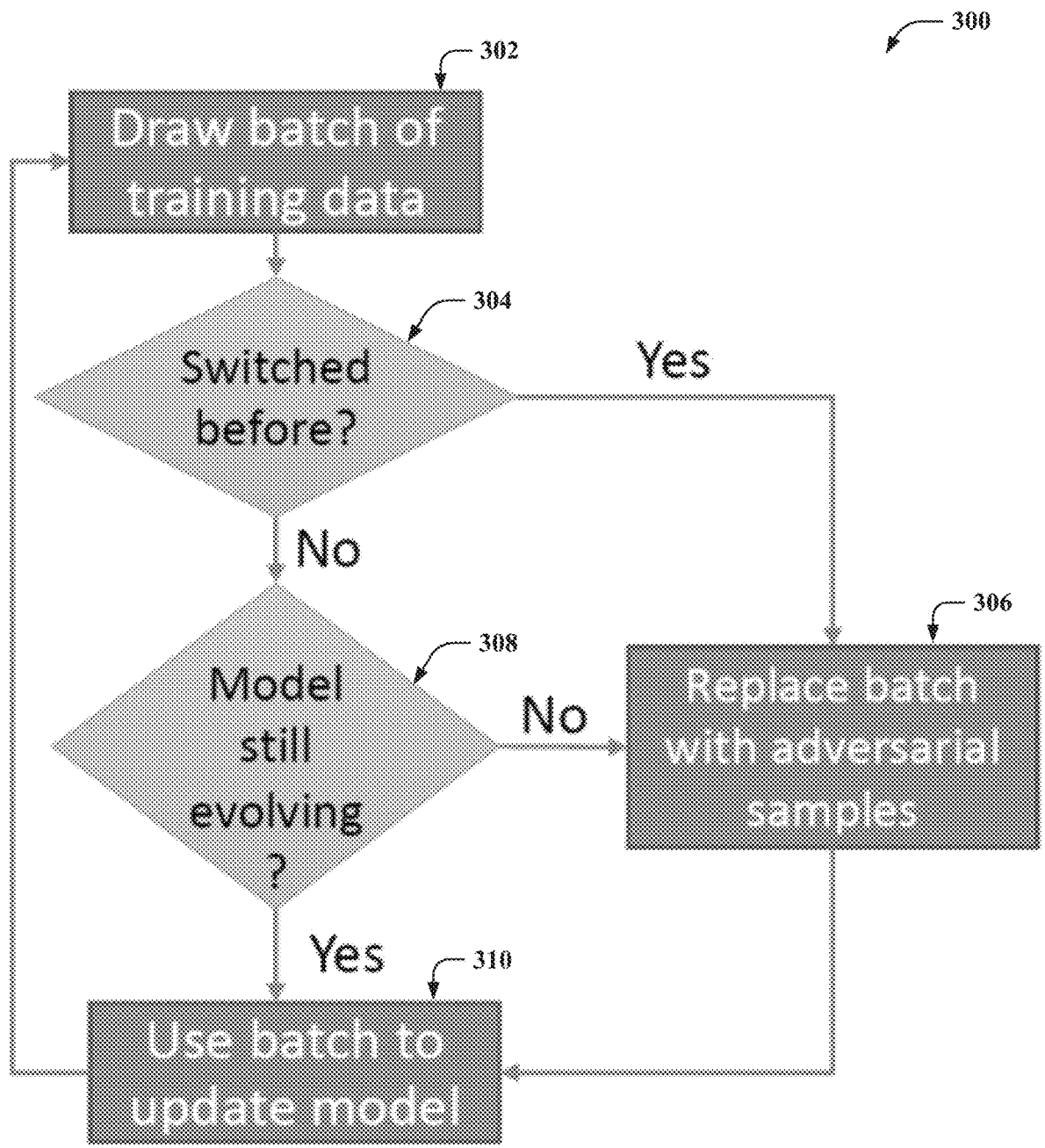
FIG. 3 illustrates a flow diagram of an example, non-limiting computer-implemented method that can facilitate switching a model training process from a ground truth training phase to an adversarial training phase based on performance of a model trained in the ground truth training phase in accordance with one or more embodiments described herein.

FIG. 3 illustrates a flow diagram of an example, non-limiting computer-implemented method 300 that can facilitate switching a model training process from a ground truth training phase to an adversarial training phase based on performance of a model trained in the ground truth training phase in accordance with one or more embodiments described herein. Repetitive description of like elements and/or processes employed in respective embodiments is omitted for sake of brevity.

At each training epoch of a model training process, model training system 102 (e.g., via analysis component 108, trainer component 110, and/or sample generator component 202) can implement computer-implemented method 300 to facilitate switching the model training process from a ground truth training phase to an adversarial training phase based on performance of a model trained in the ground truth training phase in accordance with one or more embodiments of the subject disclosure described herein.

At 302, computer-implemented method 300 can comprise drawing a batch of training data. For example, at a current training epoch model training system 102 can draw (e.g., obtain) a batch of training data comprising images from a public images dataset to train a model (e.g., a neural network, etc.).

At 304, computer-implemented method 300 can comprise determining whether a model training process implemented (e.g., via trainer component 110) to train the model has been switched from a ground truth training phase to an adversarial training phase. For example, at 304, model training system 102 can determine at a current training epoch whether trainer component 110 has switched a model training process from a ground truth training phase to an adversarial training phase based on identification (e.g., via analysis component 108) of a performance condition of the model as described above with reference to FIG. 1.

If it is determined at 304 that the model training process implemented to train the model has been switched (e.g., via trainer component 110) from a ground truth training phase to an adversarial training phase, at 306, computer-implemented method 300 can comprise replacing the batch of training data with adversarial samples. For example, at 306, trainer component 110 can replace the batch of training data obtained at 302 with adversarial training samples generated by sample generator component 202 as described above with reference to FIG. 2. Based on such replacement at 306 of the batch of training data with adversarial samples, at 310, computer-implemented method can comprise using the batch of training data to update the model. For example, at 310, trainer component 110 can use the batch of adversarial samples that replace the batch of training data at 306 to update the model.

If it is determined at 304 that the model training process implemented to train the model has not been switched (e.g., via trainer component 110) from a ground truth training phase to an adversarial training phase, at 308, computer-implemented method 300 can comprise determining whether the model is still evolving. For example, at 308, analysis component 108 can determine at a current training epoch: a) whether test accuracy values of the model over a defined number of training epochs are within a defined range of values; and/or b) whether a learning rate reduction (e.g., the first learning rate reduction) of the model is within a defined number of training epochs from a current training epoch as described above with reference to FIG. 1.

If it is determined at 308 that the model is still evolving, at 310, computer-implemented method 300 can comprise using (e.g., via trainer component 110) the batch of training data obtained at 302 to update the model. If it is determined at 308 that the model is not still evolving, at 306, computer-implemented method 300 can comprise replacing the batch of training data with adversarial samples and, at 310, using (e.g., via trainer component 110) the batch of adversarial samples that replace the batch of training data at 306 to update the model.

At each subsequent training epoch of a model training process, model training system 102 (e.g., via analysis component 108, trainer component 110, and/or sample generator component 202) can repeat steps 302 to 310 of computer-implemented method 300 to facilitate switching the model training process from a ground truth training phase to an adversarial training phase based on performance of a model trained in the ground truth training phase in accordance with one or more embodiments of the subject disclosure described herein. In some embodiments (not illustrated in FIG. 3), based on switching the model training process from a ground truth training phase to an adversarial training phase (e.g., at step 306), model training system 102 (e.g., via analysis component 108, trainer component 110, and/or sample generator component 202) can repeat steps 302, 304, 306, and 310 of computer-implemented method 300 at each subsequent training epoch to continue training the model using adversarial training data until model training system 102 (e.g., via analysis component 108) identifies convergence of test accuracy values of the model. In these embodiments, based on such identification of the model convergence, computer-implemented method 300 can end.

Figure 4:
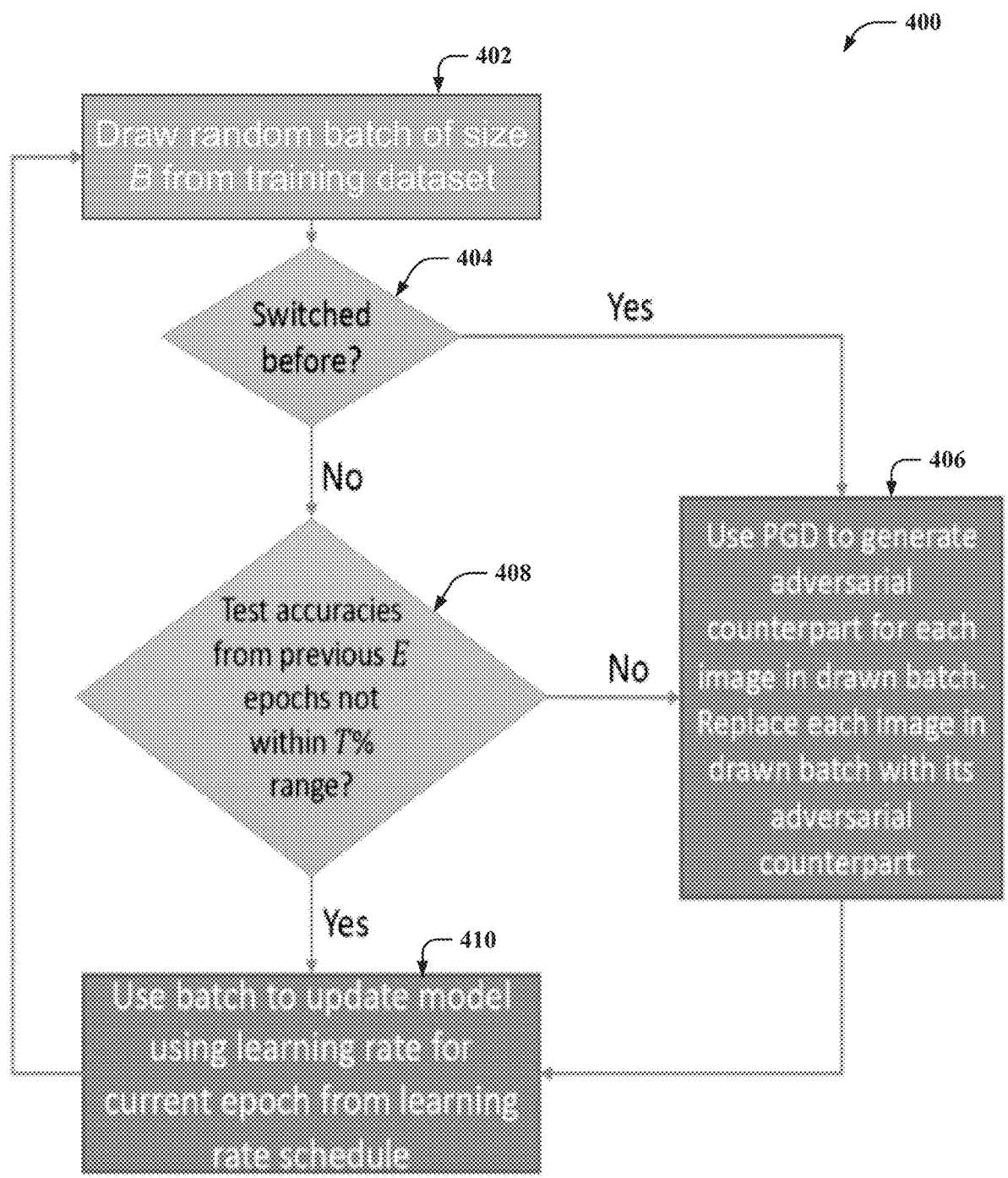
FIG. 4 illustrates a flow diagram of an example, non-limiting computer-implemented method that can facilitate switching a model training process from a ground truth training phase to an adversarial training phase based on performance of a model trained in the ground truth training phase in accordance with one or more embodiments described herein.

FIG. 4 illustrates a flow diagram of an example, non-limiting computer-implemented method 400 that can facilitate switching a model training process from a ground truth training phase to an adversarial training phase based on performance of a model trained in the ground truth training phase in accordance with one or more embodiments described herein. Repetitive description of like elements and/or processes employed in respective embodiments is omitted for sake of brevity.

At each training epoch of a model training process, model training system 102 (e.g., via analysis component 108, trainer component 110, and/or sample generator component 202) can implement computer-implemented method 400 to facilitate switching the model training process from a ground truth training phase to an adversarial training phase based on performance of a model trained in the ground truth training phase in accordance with one or more embodiments of the subject disclosure described herein.

At 402, computer-implemented method 400 can comprise drawing a random batch of training data of size B from the ground truth training dataset. For example, at a current training epoch model training system 102 can draw (e.g., obtain) a random batch of training data of size B from the ground truth training dataset to train a model (e.g., a neural network, etc.), where such batch of training data can comprise, for instance, images.

At 404, computer-implemented method 400 can comprise determining whether a model training process implemented (e.g., via trainer component 110) to train the model has been switched from a ground truth training phase to an adversarial training phase. For example, at 404, model training system 102 can determine at a current training epoch whether trainer component 110 has switched a model training process from a ground truth training phase to an adversarial training phase based on identification (e.g., via analysis component 108) of a performance condition of the model as described above with reference to FIG. 1.

If it is determined at 404 that the model training process implemented to train the model has been switched (e.g., via trainer component 110) from a ground truth training phase to an adversarial training phase, at 406, computer-implemented method 400 can comprise using projected gradient descent (PGD) to generate an adversarial counterpart for each image in the batch of training data drawn at 402 and/or replacing each image in the drawn batch of training data with its adversarial counterpart. For example, at 406, sample generator component 202 can use PGD to generate an adversarial counterpart for each image in the batch of training data drawn at 402 and/or trainer component 110 can replace each image in the drawn batch of training data with its adversarial counterpart. Based on such generation of adversarial counterparts and replacement of the images in the batch of training data with the adversarial counterparts, at 410, computer-implemented method can comprise using the batch of training data to update the model using the learning rate for the current training epoch from the learning rate schedule. For example, at 410, trainer component 110 can use the batch of adversarial samples that replace the batch of training data at 406 to update the model using the learning rate for the current training epoch from the learning rate schedule.

If it is determined at 404 that the model training process implemented to train the model has not been switched (e.g., via trainer component 110) from a ground truth training phase to an adversarial training phase, at 408, computer-implemented method 400 can comprise determining whether the test accuracies of the model from a defined number of previous E epochs are not within a defined T % range. For example, at 408, analysis component 108 can determine at a current training epoch whether the test accuracy values of the model over a defined number of previous E epochs (training epochs) are not within a defined T % range of values (e.g., within a range of +/−5% of a running average of test accuracies as described above with reference to FIG. 1).

If it is determined at 408 that the test accuracies of the model from a defined number of previous E epochs are not within a defined T % range, at 410, computer-implemented method 400 can comprise using (e.g., via trainer component 110) the batch of training data obtained at 402 to update the model using the learning rate for the current training epoch from the learning rate schedule. If it is determined at 408 that the test accuracies of the model from a defined number of previous E epochs are within a defined T % range, computer-implemented method 400 can comprise: at 406, using (e.g., via sample generator component 202) PGD to generate an adversarial counterpart for each image in the batch of training data drawn at 402 and replacing (e.g., via trainer component 110) each image in the drawn batch of training data with its adversarial counterpart; and/or, at 410, using (e.g., via trainer component 110) the batch of adversarial samples that replace the batch of training data at 406 to update the model using the learning rate for the current training epoch from the learning rate schedule.

At each subsequent training epoch of a model training process, model training system 102 (e.g., via analysis component 108, trainer component 110, and/or sample generator component 202) can repeat steps 402 to 410 of computer-implemented method 400 to facilitate switching the model training process from a ground truth training phase to an adversarial training phase based on performance of a model trained in the ground truth training phase in accordance with one or more embodiments of the subject disclosure described herein.

Figure 5:
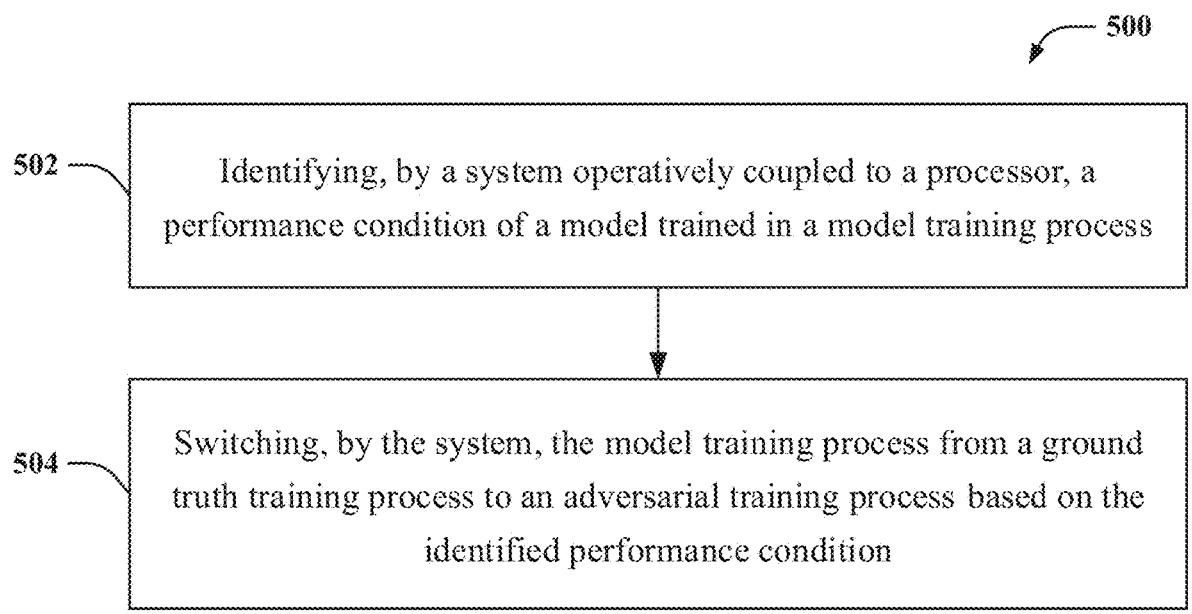
FIG. 5 illustrates a flow diagram of an example, non-limiting computer-implemented method that can facilitate switching a model training process from a ground truth training phase to an adversarial training phase based on performance of a model trained in the ground truth training phase in accordance with one or more embodiments described herein.

FIG. 5 illustrates a flow diagram of an example, non-limiting computer-implemented method 500 that can facilitate switching a model training process from a ground truth training phase to an adversarial training phase based on performance of a model trained in the ground truth training phase in accordance with one or more embodiments described herein. Repetitive description of like elements and/or processes employed in respective embodiments is omitted for sake of brevity.

At 502, computer-implemented method 500 can comprise identifying, by a system (e.g., via model training system 102 and/or analysis component 108) operatively coupled to a processor (e.g., processor 106, a quantum processor, etc.), a performance condition of a model trained (e.g., via trainer component 110, etc.) in a model training process. For example, analysis component 108 can identify the performance condition, which as described above with reference to FIG. 1 can comprise: a) test accuracy values of the model over a defined number of training epochs are within a defined range of values; and/or b) a learning rate reduction of the model is within a defined number of training epochs from a current training epoch. In another example, the model can comprise a residual neural network (ResNet) 50, a wide residual neural network (WideResNet) 28×10, and/or another model.

At 504, computer-implemented method 500 can comprise switching, by the system (e.g., via model training system 102 and/or trainer component 110), the model training process from a ground truth training process to an adversarial training process based on the identified performance condition. For example, as described above with reference to FIGS. 1 and 2, based on identification of the performance condition, trainer component 110 can switch the model training process from a ground truth training process to an adversarial training process where trainer component 110 can train the model using adversarial training samples generated by sample generator component 202 until convergence of test accuracy values of the model.

Figure 6:
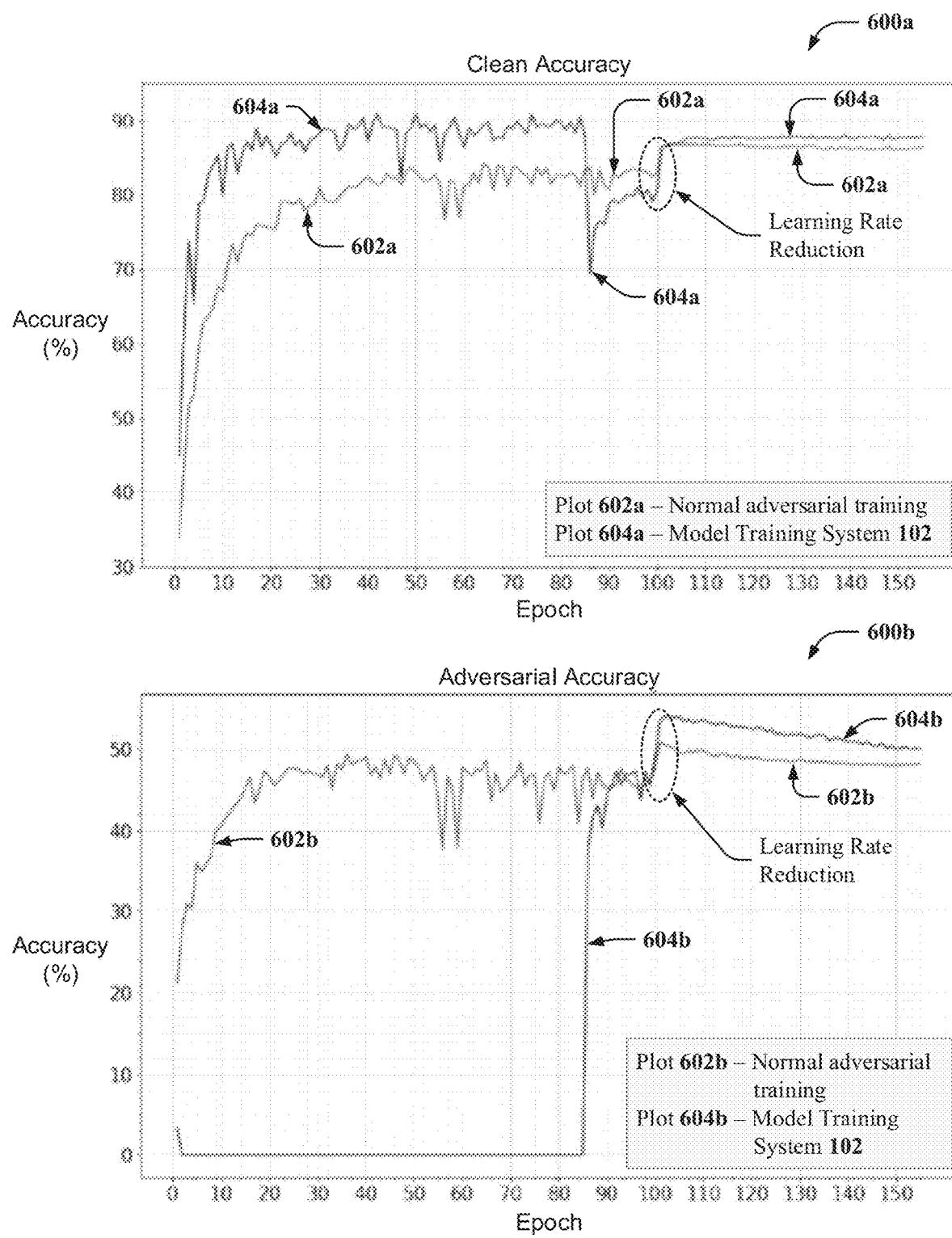
FIG. 6 illustrates example, non-limiting graphs that show the model accuracy convergence when switching a model training process from a ground truth training phase to an adversarial training phase based on performance of a model trained in the ground truth training phase in accordance with one or more embodiments described herein.

FIG. 6 illustrates example, non-limiting graphs 600a, 600b that show the convergence of model accuracy when switching a model training process from a ground truth training phase to an adversarial training phase based on performance of a model trained in the ground truth training phase in accordance with one or more embodiments described herein. Repetitive description of like elements and/or processes employed in respective embodiments is omitted for sake of brevity.

Graph 600a comprises a plot 602a depicting example, non-limiting clean test accuracy results of a model (e.g., a residual neural network (ResNet) 50, a wide residual neural network (WideResNet) 28×10, etc.) trained using normal adversarial training (e.g., using one or more existing adversarial training techniques). Graph 600a further comprises a plot 604a depicting example, non-limiting clean test accuracy results of the model trained using model training system 102, where adversarial samples have been introduced to the model after 85 training epochs (denoted as Epochs in FIG. 6). Such example, non-limiting clean test accuracy results illustrated in graph 600a represent the model's ability to accurately classify ground truth samples when tested. Graph 600a depicts such example, non-limiting clean test accuracy values as a percentage (%) in the Y-axis for each training epoch depicted in the X-axis. As illustrated by plot 602a and plot 604a, the clean test accuracy of the model trained using model training system 102 in accordance with one or more embodiments described herein is higher than the clean test accuracy of the model trained using normal adversarial training.

Graph 600b comprises a plot 602b depicting example, non-limiting adversarial test accuracy results of a model (e.g., a residual neural network (ResNet) 50, a wide residual neural network (WideResNet) 28×10, etc.) trained using normal adversarial training (e.g., using one or more existing adversarial training techniques). Graph 600b further comprises a plot 604b depicting example, non-limiting adversarial test accuracy results of the model trained using model training system 102, where adversarial samples have been introduced to the model after 85 training epochs (denoted as Epochs in FIG. 6). Such example, non-limiting adversarial test accuracy results illustrated in graph 600b represent the model's ability to accurately classify adversarial samples when tested (e.g., the model's ability to accurately classify modified versions of ground truth samples having one or more targeted perturbations). Graph 600b depicts such example, non-limiting adversarial test accuracy values as a percentage (%) in the Y-axis for each training epoch depicted in the X-axis. As illustrated by plot 602b and plot 604b, the adversarial test accuracy of the model trained using model training system 102 in accordance with one or more embodiments described herein is higher than the adversarial test accuracy of the model trained using normal adversarial training. Additionally, or alternatively, since the adversarial training can be invoked after 85 training epochs as illustrated in plot 604a and/or plot 604b, the total amount of computation is much lower which reduces the training time significantly.

FIG. 7 illustrates example, non-limiting tables 700a, 700b that demonstrate example accuracy and reduction in training time in accordance with one or more embodiments described herein. Repetitive description of like elements and/or processes employed in respective embodiments is omitted for sake of brevity.

Table 700a comprises example, non-limiting training times resulting from training a residual neural network (ResNet) 50 and a wide residual neural network (WideResNet) 28×10 using normal adversarial training (denoted as Adversarial training in FIG. 7) and using model training system 102 (denoted as Proposed in FIG. 7), where adversarial samples have been introduced to the models after 85 training epochs (e.g., as described above and illustrated in graphs 600a, 600b depicted in FIG. 6). As illustrated by table 700a, the example, non-limiting training times resulting from training such models using model training system 102 in accordance with one or more embodiments described herein is approximately 45% less than the training times resulting from training the models using normal adversarial training (e.g., using one or more existing adversarial training techniques).

Table 700b comprises example, non-limiting adversarial test accuracies of two models tested using adversarial samples having various attack strengths ranging from a relatively low attack strength of −2 to a relatively high attack strength of 4 as depicted in FIG. 7, where an attack strength of 0 represents the training adversary strength, and where each model was trained using normal adversarial training (denoted as Adversarial training in FIG. 7) and using model training system 102 (denoted as Proposed in FIG. 7). More specifically, table 700b comprises example, non-limiting adversarial test accuracies of a residual neural network (ResNet) 50 and a wide residual neural network (WideResNet) 28×10 tested using adversarial samples having the various attack strengths depicted in FIG. 7, where each model was trained using normal adversarial training (e.g., using one or more existing adversarial training techniques) and using model training system 102, and where adversarial samples have been introduced to the models after 85 training epochs (e.g., as described above and illustrated in graphs 600a, 600b depicted in FIG. 6). As illustrated by table 700b, the resistance of each of the models to adversarial samples having the various attack strengths depicted in FIG. 7 resulting from training such models using model training system 102 in accordance with one or more embodiments described herein is at least comparable in all tests and better in most tests when compared to the resistance of the models resulting from training the models using normal adversarial training.

Model training system 102 can be associated with various technologies. For example, model training system 102 can be associated with model training technologies, artificial intelligence model training technologies, machine learning model training technologies, ground truth model training technologies, adversarial model training technologies, computer technologies, server technologies, cloud computing technologies, information technology (IT) technologies, internet-of-things (IoT) technologies, automation technologies, and/or other technologies.

Model training system 102 can provide technical improvements to systems, devices, components, operational steps, and/or processing steps associated with the various technologies identified above. For example, model training system 102 can: a) identify a performance condition of a model trained in a model training process; b) switch the model training process from a ground truth training process to an adversarial training process based on the identified performance condition; and/or c) thereafter train the model using only adversarial training data until convergence of test accuracy values of the model, thereby facilitating at least one of reduced overall robustness training time, reduced adversarial sample generation time, reduced computational costs of a processor (e.g., processor 106) used to generate the adversarial samples and/or to train the model, or improved accuracy of the model trained using ground truth training data and adversarial training data.

Model training system 102 can provide technical improvements to a processing unit (e.g., processor 106) associated with a classical computing device and/or a quantum computing device (e.g., a quantum processor, quantum hardware, superconducting circuit, etc.). For example, based on such reduced overall robustness training time and/or reduced adversarial sample generation time by a processor (e.g., processor 106) used to train the model and/or to generate the adversarial samples as described above, model training system 102 can thereby facilitate improved performance, improved efficiency, and/or reduced computational cost of such a processor (e.g., processor 106).

A practical application of model training system 102 is that it can be implemented to train a model in approximately 45% less time compared to existing adversarial training techniques, where more often than not (e.g., with reference to table 700b depicted in FIG. 7) such a model can more accurately classify clean samples (ground truth samples) and adversarial samples when compared to models trained using existing adversarial training techniques. Such a practical application of model training system 102 can thereby enable reduced use of a graphics processing unit (GPU) to train and/or implement the model.

It should be appreciated that model training system 102 provides a new approach driven by relatively new model training technologies (e.g., machine learning model training technologies). For example, model training system 102 provides a new approach to switch a model training process from a ground truth training phase to an adversarial training phase based on performance of a model trained in the ground truth training phase, as opposed to training the model from the beginning of the training process using both ground truth training data and adversarial training data or to training the model using adversarial training data at the end of the training process.

Model training system 102 can employ hardware or software to solve problems that are highly technical in nature, that are not abstract and that cannot be performed as a set of mental acts by a human. Some of the processes described herein can be performed by one or more specialized computers (e.g., one or more specialized processing units, a specialized quantum computer, etc.) for carrying out defined tasks related to the various technologies identified above. Model training system 102 and/or components thereof, can be employed to solve new problems that arise through advancements in technologies mentioned above, employment of quantum computing systems, cloud computing systems, computer architecture, and/or another technology.

It is to be appreciated that model training system 102 can utilize various combinations of electrical components, mechanical components, and circuitry that cannot be replicated in the mind of a human or performed by a human, as the various operations that can be executed by model training system 102 and/or components thereof as described herein are operations that are greater than the capability of a human mind. For instance, the amount of data processed, the speed of processing such data, or the types of data processed by model training system 102 over a certain period of time can be greater, faster, or different than the amount, speed, or data type that can be processed by a human mind over the same period of time.

According to several embodiments, model training system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that model training system 102 can include information that is impossible to obtain manually by an entity, such as a human user. For example, the type, amount, or variety of information included in model training system 102, analysis component 108, trainer component 110, and/or sample generator component 202 can be more complex than information obtained manually by a human user.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be performed to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
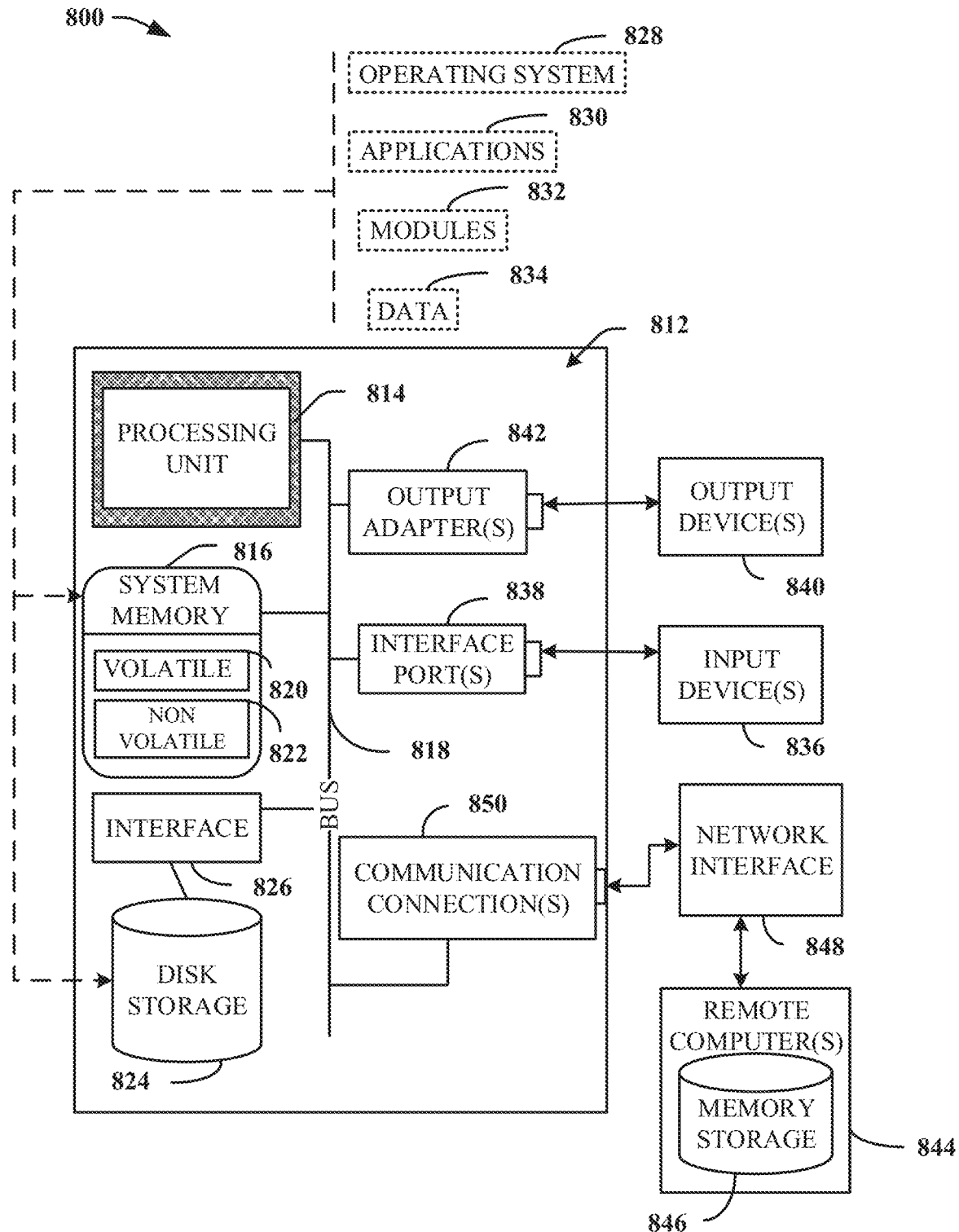
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection (s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
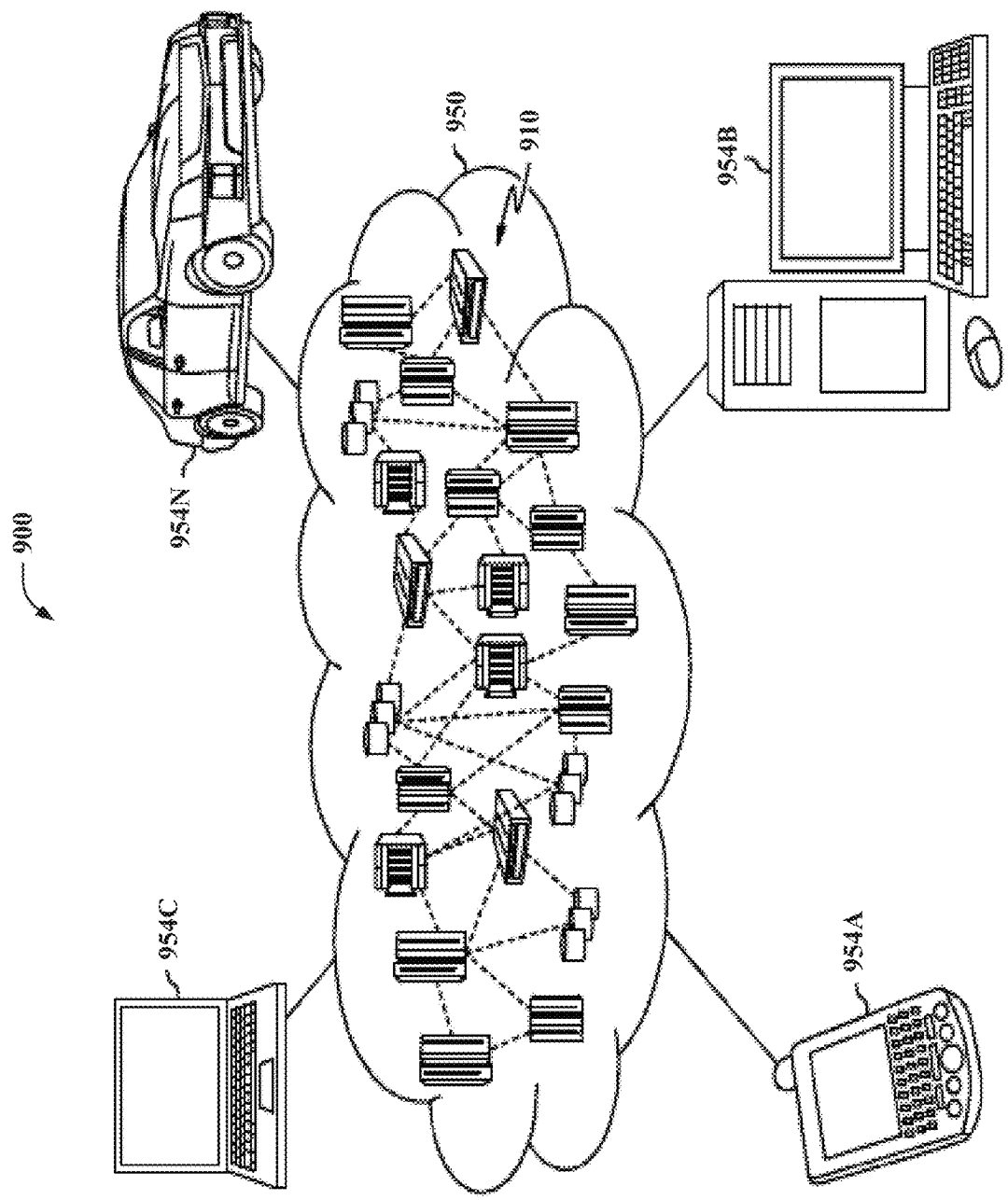
FIG. 9 illustrates a block diagram of an example, non-limiting cloud computing environment in accordance with one or more embodiments of the subject disclosure.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
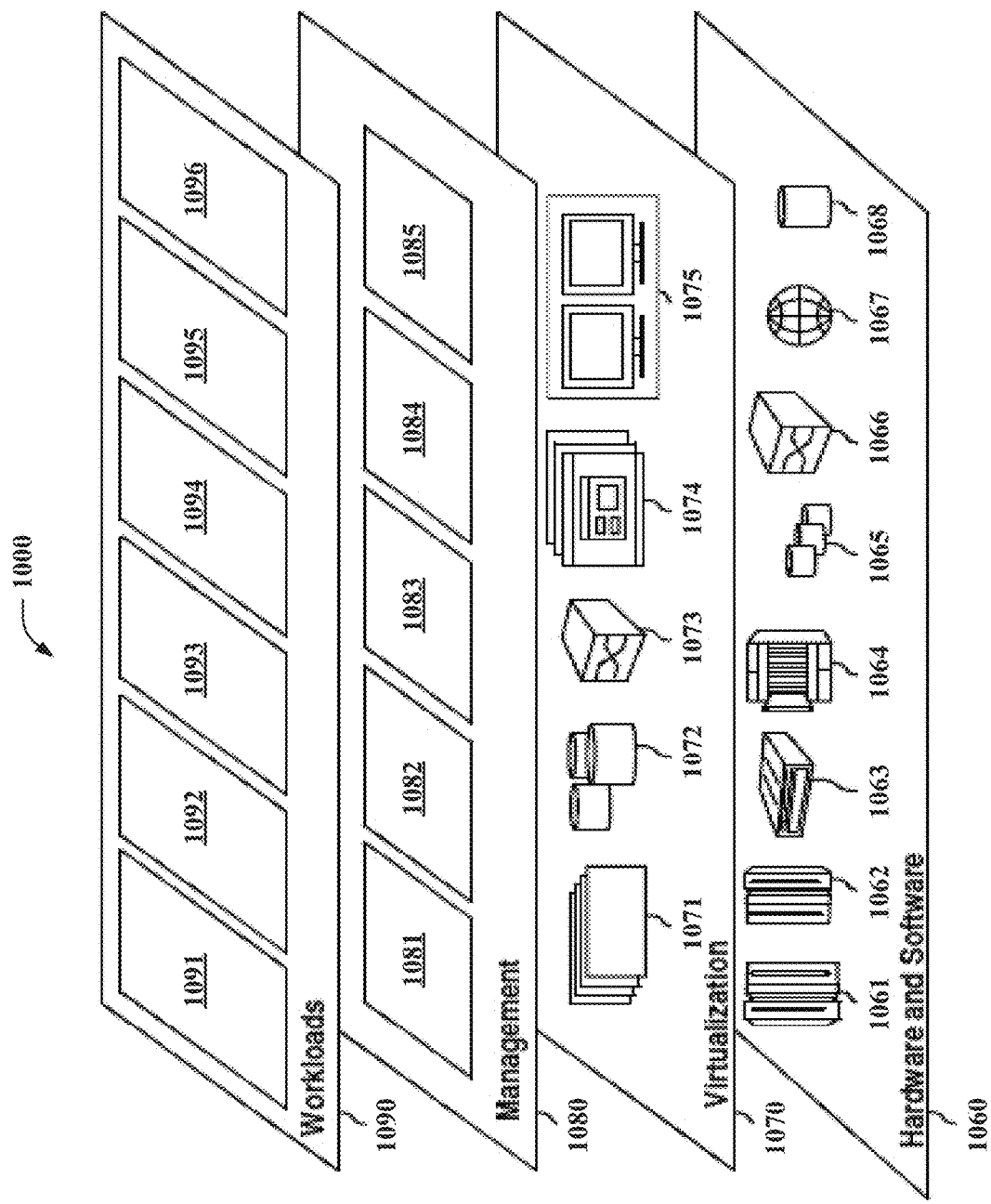
FIG. 10 illustrates a block diagram of example, non-limiting abstraction model layers in accordance with one or more embodiments of the subject disclosure.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized.

Non-limiting examples of workloads and functions which may be provided from this layer include: mapping and navigation 1091; software development and lifecycle management 1092; virtual classroom education delivery 1093; data analytics processing 1094; transaction processing 1095; and model training software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes the computer executable components stored in the memory, wherein the computer executable components comprise:
      an analysis component that identifies a performance condition of a model trained in a model training process; and
      a trainer component that switches the model training process from a ground truth training process to an adversarial training process based on the identified performance condition, wherein the analysis component determines a test accuracy value of the model at a current training epoch and computes a running average of test accuracy values of the model over a defined number of training epochs to identify the performance condition.

2. The system of claim 1, wherein the trainer component trains the model until the analysis component determines if the model is still evolving by checking if the test accuracy values of the model over a defined number of training epochs are within a defined range of values.

3. The system of claim 1, wherein the trainer component trains the model until the analysis component determines that a learning rate reduction of the model is within a defined number of training epochs from a current training epoch.

4. The system of claim 1, wherein based on identification of the performance condition the trainer component trains the model until convergence of test accuracy values of the model.

5. The system of claim 1, wherein the computer executable components further comprise:
   a sample generator component that generates adversarial training data to train the model using the adversarial training process based on identification of the performance condition.

6. The system of claim 1, wherein the trainer component switches the model training process from the ground truth training process to the adversarial training process based on the performance condition to facilitate at least one of reduced overall robustness training time, reduced adversarial sample generation time, reduced computational costs of the processor, or improved accuracy of the model trained using ground truth training data and adversarial training data.

7. A computer-implemented method, comprising:
   identifying, by a system operatively coupled to a processor, a performance condition of a model trained in a model training process; and
   switching, by the system, the model training process from a ground truth training process to an adversarial training process based on the identified performance condition;
   determining, by the system, a test accuracy value of the model at a current training epoch; and
   computing, by the system, a running average of test accuracy values of the model over a defined number of training epochs to identify the performance condition.

8. The computer-implemented method of claim 7, further comprising:
   training, by the system, the model until test accuracy values of the model over a defined number of training epochs are within a defined range of values.

9. The computer-implemented method of claim 7, further comprising:
   training, by the system, the model until a learning rate reduction of the model is within a defined number of training epochs from a current training epoch.

10. The computer-implemented method of claim 7, further comprising:
    training, by the system, the model, based on identification of the performance condition, until convergence of test accuracy values of the model.

11. The computer-implemented method of claim 7, further comprising:
    generating, by the system, adversarial training data to train the model using the adversarial training process based on identification of the performance condition.

12. The computer-implemented method of claim 7, further comprising:
    switching, by the system, the model training process from the ground truth training process to the adversarial training process based on the performance condition to facilitate at least one of reduced overall robustness training time, reduced adversarial sample generation time, reduced computational costs of the processor, or improved accuracy of the model.

13. A computer program product facilitating a process to switch a model training process from a ground truth training phase to an adversarial training phase based on performance of a model trained in the ground truth training phase, the computer program product comprising a computer readable storage medium having program instructions embodied therewith, the program instructions executable by a processor to cause the processor to:
    identify, by the processor, a performance condition of a model trained in a model training process; and switch, by the processor, the model training process from a ground truth training process to an adversarial training process based on the identified performance condition;

determine, by the processor, a test accuracy value of the model at a current training epoch; and compute, by the processor, a running average of test accuracy values of the model over a defined number of training epochs to identify the performance condition.

14. The computer program product of claim 13, wherein the program instructions are further executable by the processor to cause the processor to:

train, by the processor, the model until test accuracy values of the model over a defined number of training epochs are within a defined range of values.

15. The computer program product of claim 13, wherein the program instructions are further executable by the processor to cause the processor to:

train, by the processor, the model until a learning rate reduction of the model is within a defined number of training epochs from a current training epoch.

16. The computer program product of claim 13, wherein the program instructions are further executable by the processor to cause the processor to:

train, by the processor, the model, based on identification of the performance condition, until convergence of test accuracy values of the model.

17. The computer program product of claim 13, wherein the program instructions are further executable by the processor to cause the processor to:

generate, by the processor, adversarial training data to train the model using the adversarial training process based on identification of the performance condition.

* * * * *